US012570799B2

(12) United States Patent
Hirano et al.

(10) Patent No.: US 12,570,799 B2
(45) Date of Patent: Mar. 10, 2026

(54) CRYSTALLINE POLYETHERNITRILE

(71) Applicant: Toray Industries, Inc, Tokyo (JP)

(72) Inventors: Taisuke Hirano, Nagoya (JP); Risano Nakajima, Otsu (JP); Masato Akahira, Nagoya (JP); Soichiro Iwahana, Nagoya (JP); Koji Yamauchi, Nagoya (JP)

(73) Assignee: Toray Industries, Inc., Tokyo (JP)

(*) Notice: Subject to any disclaimer, the term of this patent is extended or adjusted under 35 U.S.C. 154(b) by 558 days.

(21) Appl. No.: 17/927,327

(22) PCT Filed: May 24, 2021

(86) PCT No.: PCT/JP2021/019592
§ 371 (c)(1),
(2) Date: Nov. 22, 2022

(87) PCT Pub. No.: WO2021/241492
PCT Pub. Date: Dec. 2, 2021

(65) Prior Publication Data

US 2023/0220159 A1 Jul. 13, 2023

(30) Foreign Application Priority Data

May 28, 2020 (JP) ................................ 2020-092842
May 28, 2020 (JP) ................................ 2020-092843
(Continued)

(51) Int. Cl.
*C08G 65/40* (2006.01)

(52) U.S. Cl.
CPC ......... *C08G 65/40* (2013.01); *C08G 2250/00* (2013.01); *C08G 2650/50* (2013.01)

(58) Field of Classification Search
CPC ................ C08G 65/40; C08G 65/4093; C08G 65/4006; C08G 65/46; C08G 2650/50; C08G 2650/64; C08G 2250/00
See application file for complete search history.

(56) References Cited

U.S. PATENT DOCUMENTS 4,640,974 A * 2/1987 Matsuo .............. C08G 65/4006 528/211
4,703,104 A * 10/1987 Matsuo .............. C08G 65/4031 528/211
5,089,340 A 2/1992 Matsuo et al.

FOREIGN PATENT DOCUMENTS

CN 1124745 A 6/1996
CN 101050277 A 10/2007
(Continued)

OTHER PUBLICATIONS

Extended European Search Report dated May 28, 2024, of counterpart European Patent Application No. 21812402.2.
(Continued)

*Primary Examiner* — Shane Fang
(74) *Attorney, Agent, or Firm* — DLA Piper LLP (US)

(57) ABSTRACT

A crystalline polyethernitrile with a difference between a melting point and a crystallization temperature at a time of temperature-fall being 40° C. or more and 100° C. or less, the crystalline polyethernitrile includes N repeating units
(Continued)

represented by Formula (I) and M repeating units represented by Formula (II), N and M being integers satisfying 0.90<[N/(N+M)]<1.00:

(I)

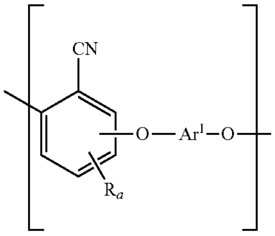

(II)

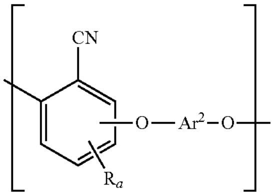

in Formulas (I) and (II), $Ar^1$ and $Ar^2$ have one framework selected from units represented by Formula (a) to Formula (f), with a proviso that $Ar^1$ and $Ar^2$ are not the same, (a)

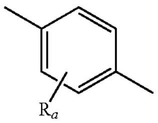

(b)

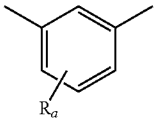

(c)

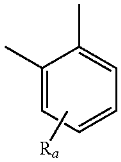

(d)

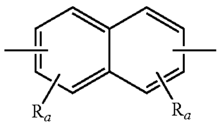

(e)

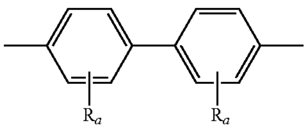

(f)

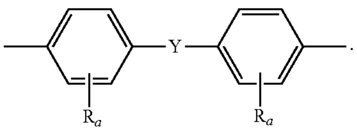

-continued

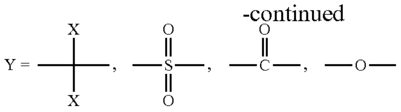

8 Claims, 2 Drawing Sheets

(30) Foreign Application Priority Data

May 28, 2020 (JP) ................................ 2020-092844
Dec. 24, 2020 (JP) ................................ 2020-215722

(56) References Cited

FOREIGN PATENT DOCUMENTS

| | | | |
|---|---|---|---|
| CN | 101948568 | A | 1/2011 |
| CN | 102492131 | A | 6/2012 |
| CN | 102516528 | A | 6/2012 |
| CN | 102532516 | A | 7/2012 |
| CN | 102766255 | A | 11/2012 |
| CN | 110305312 | A | 10/2019 |
| EP | 0413257 | A2 | 2/1991 |
| JP | S61-57619 | A | 3/1986 |
| JP | S63-270733 | A | 11/1988 |
| JP | S63-62526 | B2 | 12/1988 |
| JP | H04-43019 | A | 2/1992 |
| JP | H05-78576 | B2 | 10/1993 |
| JP | H05-339363 | A | 12/1993 |
| JP | H06-32892 | A | 2/1994 |
| JP | H06-32893 | A | 2/1994 |
| JP | H06-279582 | A | 10/1994 |

OTHER PUBLICATIONS

A. Saxena et al., “Synthesis and Properties of Polyether Nitrile Copolymers with Pendant Methyl Groups,” European Polymer Journal, vol. 39, No. 1, pp. 57-61, 2003.

Yajie Wang et al., “Mechanical and dielectric properties of crystalline poly(arylene ether nitrile) copolymers,” High Performance Polymers, vol. 31(3), 2019, pp. 310-320.

International Search Report dated Jun. 22, 2021 in counterpart International Application No. PCT/JP2021/019592.

Written Opinion dated Jun. 22, 2021 in counterpart International Application No. PCT/JP2021/019592.

Decision to Grant dated Mar. 11, 2025, from counterpart Japanese Application No. 2021-530889.

Office Action dated Feb. 25, 2025, from counterpart Chinese Application No. 202180037789.6.

Office Action dated Jul. 4, 2025, from counterpart Chinese Patent Application No. 202180037789.6.

Wei, R. et al., “Fabrication of crosslinked single-component polyarylene ether nitrile composite with enhanced dielectric properties,” Polymer, 2019, vol. 161, pp. 162-169.

Tu, L. et al., “Crystallinity of poly (arylene ether nitrile) copolymers containing hydroquinone and bisphenol A segments,” Journal of Applied Polymer Science, 2018, 46412 (8 pages).

Tong, L. et al., “Novel high-temperature-resistant single-polymer composites based on self-reinforced phthalonitrile end-capped polyarylene ether nitrile,” Materials Letters, 2015, vol. 159, pp. 1-8.

* cited by examiner

CRYSTALLINE POLYETHERNITRILE

TECHNICAL FIELD

This disclosure relates to crystalline copolymerized polyethernitrile.

BACKGROUND

Polyethernitrile is one of the crystalline super engineering plastics having excellent heat resistance, chemical resistance, and flame retardancy and in addition mechanical properties such as abrasion resistance and friction resistance (for example, refer to Japanese Examined Patent Application Publication No. H5-78576).

Although polyethernitrile has the excellent properties as described above, polyethernitrile has a high melting point compared to other thermoplastic resins and thus processing temperature at the time of processing polyethernitrile such as injection molding and extrusion molding is high. Therefore, polyethernitrile having high crystalline properties and a low melting point has been desired.

With respect to that problem, a method of copolymerizing two kinds of dihydroxy components serving as constitutional monomers has been disclosed (for example, refer to Japanese Examined Patent Application Publication No. S63-62526 and High Performance Polymers, 2019, 31, 310-320).

Although an active functional group ends existing in polymers are generally expected to function as a reaction point of macromolecular reaction and an interaction point with additives, the active functional group ends cause deterioration in heat stability. Therefore, end capping of the active functional group ends has been studied. With respect to polyethernitrile, hydroxy ends that may exist in the polymer are also considered to cause deterioration in the heat stability. To improve the heat stability of the polymer, a method of using mono-substituted halogen compounds serving as reaction termination agents (for example, refer to Japanese Patent Application Laid-open No. S63-270733) and a method of using monovalent phenols serving as molecular weight modifiers (for example, refer to Japanese Patent Application Laid-open No. S61-57619) have been disclosed.

However, in the method described in JP '526, crystalline properties are completely impaired to become amorphous and thus processability deteriorates. In addition, how a copolymerization ratio affects to physical properties has not been described at all.

In the method described JP '576, although the melting point decreases, the crystalline properties also decreased and thus the polymer is required to be subjected to high temperature treatment for several hours.

Thus, those publications describe a mechanism or factor that enables the high crystalline properties and low melting point to be controlled.

The hydroxy group ends that may exist in polyethernitrile are expected to be utilized as the reaction point of the macromolecular reaction and the interaction point with the additive. However, analysis of hydroxy group ends is difficult and analysis of the hydroxy ends that may exist in polyethernitrile and determination of the quantity of the hydroxy group ends have not been reported. When the hydroxy group ends exist in a large quantity, it is possible that this leads to deterioration in heat stability and thus only report examples in which the polymer ends are completely capped with additives as described in JP '733 and JP '619 exist. Consequently, polyethernitrile that appropriately controls the amount of the hydroxy group ends in polyethernitrile and has excellent heat stability has not been reported.

In the methods described in JP '733 and JP '619, a third component other than monomers is required to cap the polymer ends and there has been room for improvement in processability and economic efficiency.

It could therefore be helpful to provide crystalline polyethernitrile having high crystalline properties, a low melting point, and excellent heat stability by controlling a difference between a melting point and a crystallization temperature at the time of temperature-fall in a specific range and controlling and quantifying the end structure.

SUMMARY

We thus provide:

(1) Crystalline polyethernitrile with a difference between a melting point and a crystallization temperature at a time of temperature-fall being 40° C. or more and 100° C. or less, the crystalline polyethernitrile including N repeating units represented by Formula (I) and M repeating units represented by Formula (II), N and M being integers satisfying a relation of $0.90<[N/(N+M)]<1.00$:

(I)

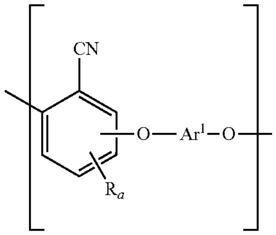

(II)

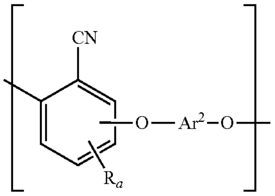

in Formulas (I) and (II), $Ar^1$ and $Ar^2$ have one framework selected from units represented by Formula (a) to Formula (f), with proviso that $Ar^1$ and $Ar^2$ are not the same, (a)

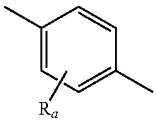

(b)

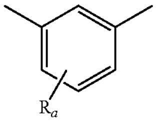

(c)

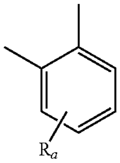

-continued (d)

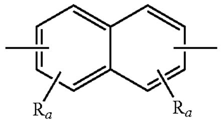

(e)

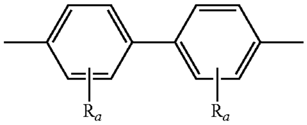

(f)

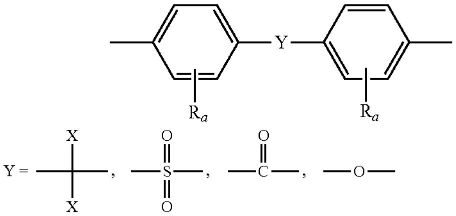

in Formula (a) to Formula (f), R is any one of a linear organic group, a branched organic group, or a cyclic organic group having a carbon number of 1 to 6, and optionally has one or more oxygen atoms, nitrogen atoms, and sulfur atoms; Rs may be the same as or different from each other; a represents number of substituents in R and is an integer from 0 to 4; and X is a hydrogen atom or a methyl group.

(2) The crystalline polyethernitrile according to (1), including N repeating units represented by Formula (III) and M repeating units represented by Formula (IV), N and M being integers satisfying a relation of 0.90<[N/(N+M)]<1.00:

(III)

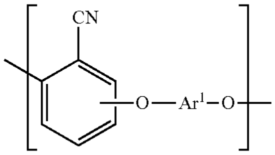

(IV)

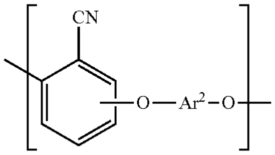

in Formulas (III) and (IV), $Ar^1$ and $Ar^2$ have one framework selected from units represented by Formula (g) to Formula (l), with proviso that $Ar^1$ and $Ar^2$ are not same, (g)

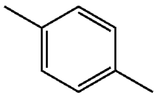

(h)

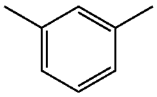

-continued (i)

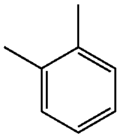

(j)

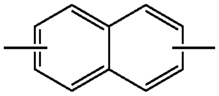

(k)

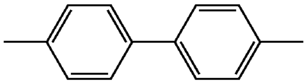

(l)

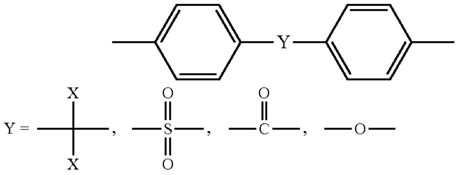

where X is a hydrogen atom or a methyl group.

(3) The crystalline polyethernitrile according to (1), including N repeating units represented by Formula (V) and M repeating units represented by Formula (VI), N and M being integers satisfying a relation of 0.90<[N/(N+M)]<1.00:

(V)

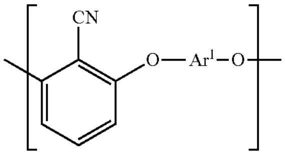

(VI)

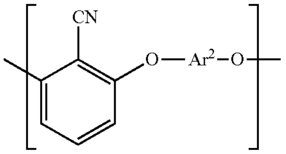

in Formula (V) and Formula (VI), $Ar^1$ and $Ar^2$ have one framework selected from units represented by Formula (g) to Formula (1), with proviso that $Ar^1$ and $Ar^2$ are not same, (g)

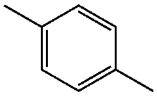

(h)

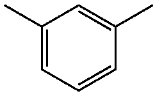

(i)

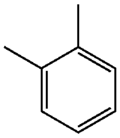

-continued (j)

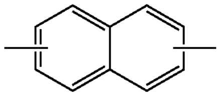

(k)

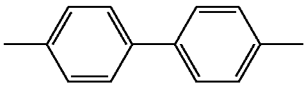

(l)

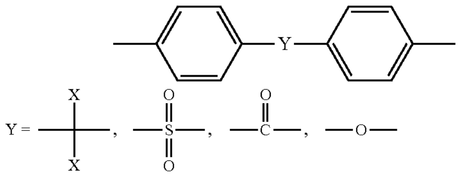

where X is a hydrogen atom or a methyl group.

(4) The crystalline polyethernitrile according to any one of (1) to (3), wherein $Ar^1$ is a paraphenylene framework or a meta-phenylene framework.

(5) The crystalline polyethernitrile according to any one of (1) to (4), wherein a melting point of the crystalline polyethernitrile is 280° C. or more and 360° C. or less.

(6) The crystalline polyethernitrile according to any one of (1) to (5), wherein a weight loss ratio of the crystalline polyethernitrile during 30-minute retention at melting point+30° C. under a non-oxidizing atmosphere in thermogravimetric analysis (TG) is 5% or less.

Crystalline polyethernitrile having high crystalline properties, a low melting point, and excellent heat stability can thus be provided.

DETAILED DESCRIPTION

Figure 1:
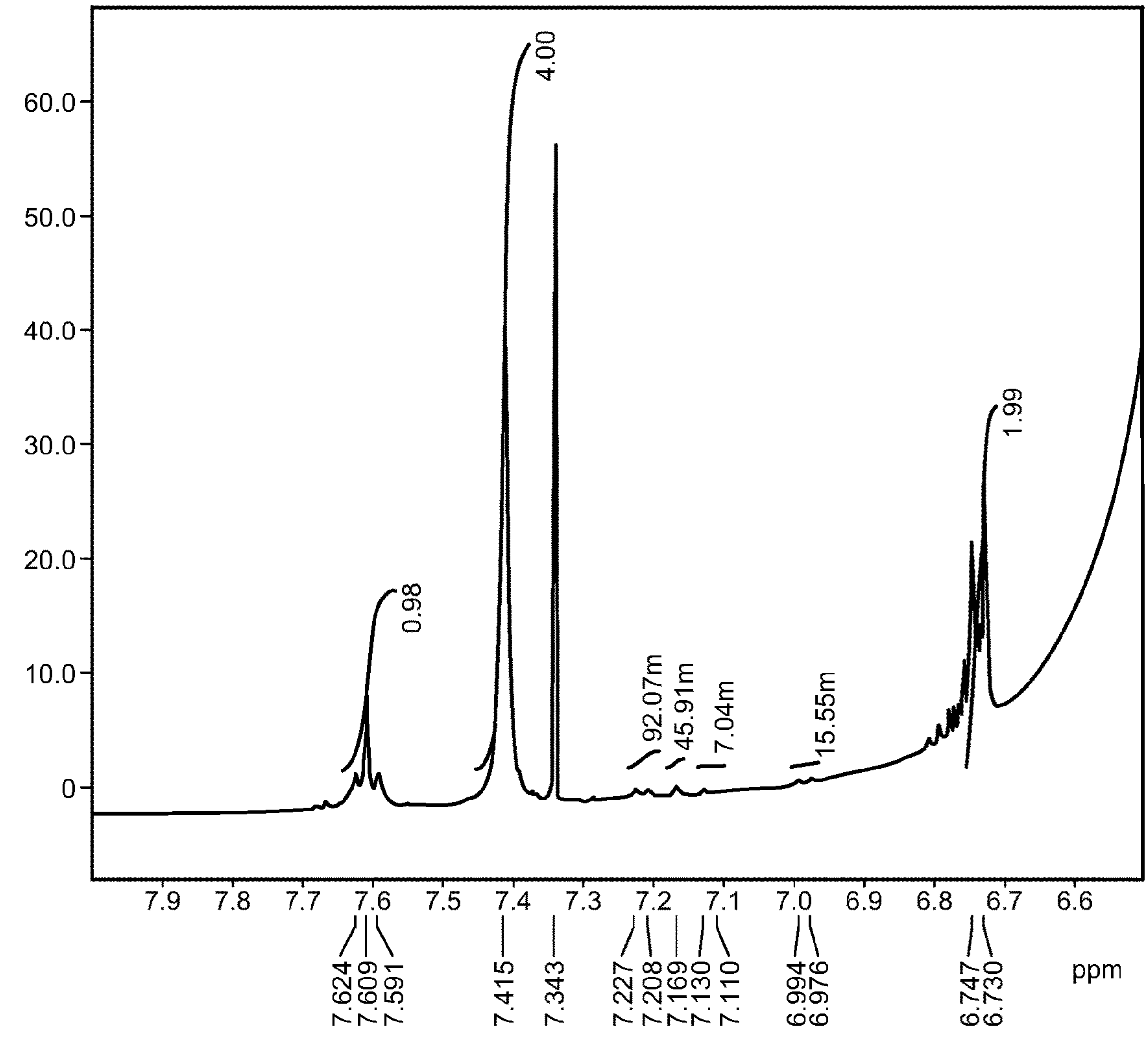
FIG. 1 is a chart illustrating a NMR spectrum of crystalline polyethernitrile obtained in Example 1.
Figure 2:
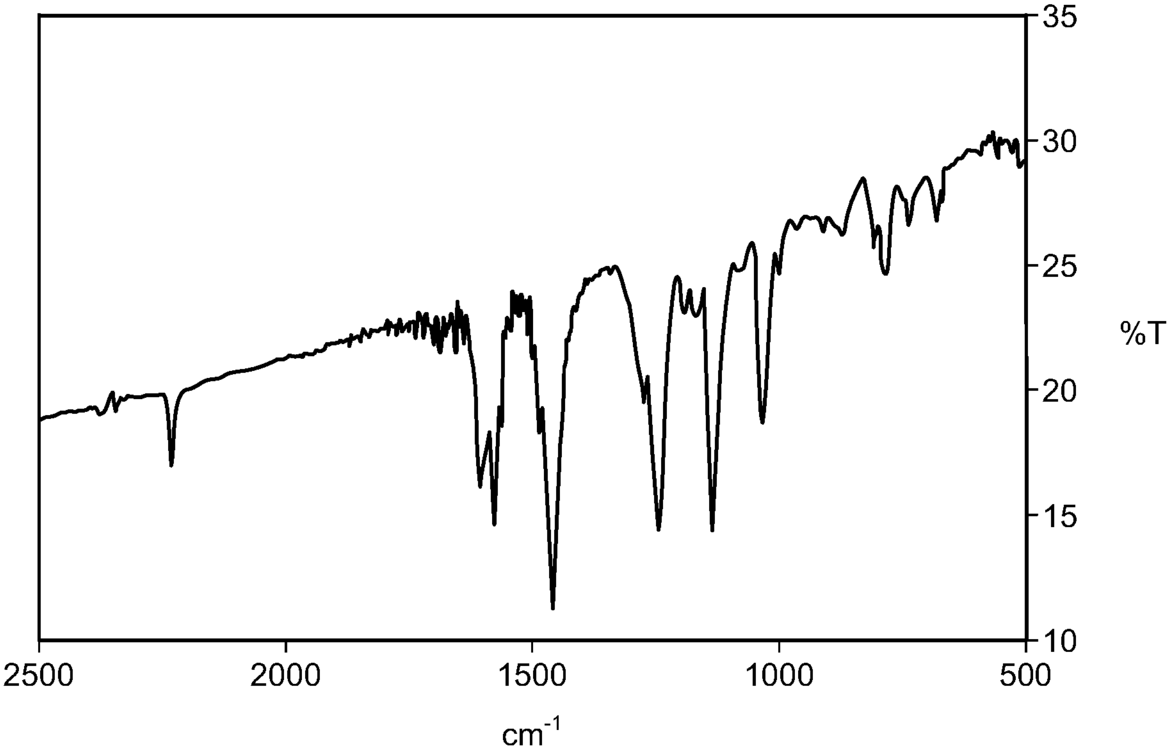
FIG. 2 is a chart illustrating an infrared spectroscopy chart of crystalline polyethernitrile obtained in Example 2.

Hereinafter, our crystalline polyethernitriles will be described in detail together with the examples.

(1) Crystalline Polyethernitrile

The crystalline polyethernitrile refers to a polymer including N repeating units represented by Formula (I) and M repeating units represented by Formula (II), and N and M are integers satisfying a relation of $0.90<[N/(N+M)]<1.00$.

(I)

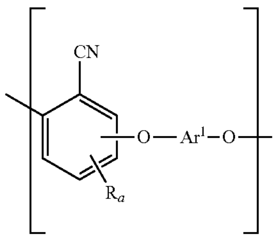

-continued (II)

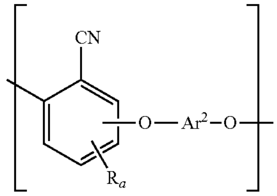

In Formula (I) and Formula (II), $Ar^1$ and $Ar^2$ have one framework selected from the units represented by Formula (a) to Formula (f). However, $Ar^1$ and $Ar^2$ are not the same.

(a)

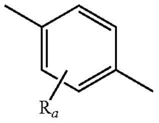

(b)

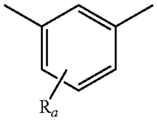

(c)

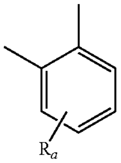

(d)

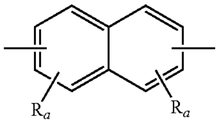

(e)

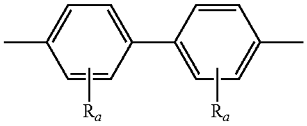

(f)

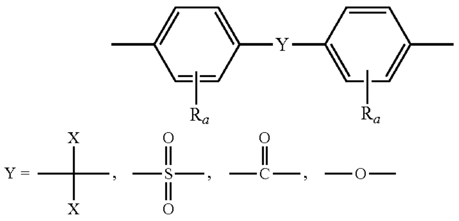

In Formulas (a) to (f), R is any one of a linear organic group, a branched organic group, or a cyclic organic group having a carbon number of 1 to 6 and optionally contains one or more oxygen atoms, nitrogen atoms, or sulfur atoms. Rs may be the same as or different from each other. a represents the number of substituents in R and is an integer from 0 to 4. X is a hydrogen atom or a methyl group.

The crystalline polyethernitrile includes N units of the repeating units represented by Formula (I) and M units of the repeating units represented by Formula (II) and N and M are integers satisfying a relation of $0.90<[N/(N+M)]<1.00$. The upper limit of [N/(N+M)] is not particularly limited as long as the upper limit is less than 1.00. As the upper limit is closer to 1.00, the melting point becomes higher and thus the upper limit is preferably 0.99 or less and more preferably 0.97 or less. The lower limit of [N/(N+M)] is not particularly limited as long as the lower limit is more than 0.90. A lower limit of less than 0.90 is not suitable because the crystalline properties decrease and the polyethernitrile is amorphous. From the viewpoint of the crystalline properties, N and M are preferably integers satisfying $0.90<[N/(N+M)]\leq 0.99$, more preferably integers satisfying $0.90<[N/(N+M)]\leq 0.97$, and further preferably integers satisfying $0.91\leq[N/(N+M)]\leq 0.97$.

The upper limit of the sum of N and M is not particularly limited. A range of 5 to 10,000 may be exemplified, a range of 5 to 5,000 is preferable, a range of 5 to 1,000 is further preferable, and a range of 5 to 500 is more preferable.

In the crystalline polyethernitrile, preferable repeating units are represented by Formula (III) and Formula (IV).

(III)

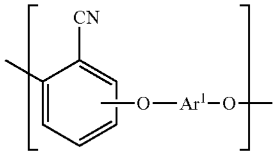

(IV)

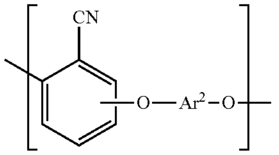

In Formula (III) and Formula (IV), $Ar^1$ and $Ar^2$ have one framework selected from the units represented by Formula (g) to Formula (1). However, $Ar^1$ and $Ar^2$ are not the same. The crystalline polyethernitrile includes N units of the repeating units represented by Formula (III) and M units of the repeating units represented by Formula (IV) and N and M are integers satisfying $0.90<[N/(N+M)]<1.00$.

(g)

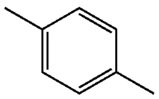

(h)

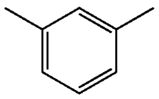

(i)

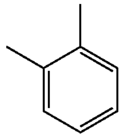

(j)

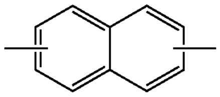

(k)

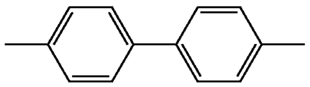

-continued (l)

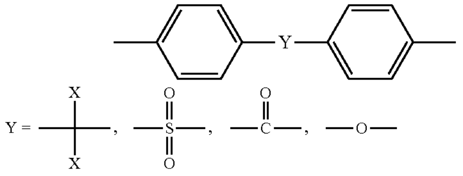

In Formula (g) to Formula (1), X is a hydrogen atom or a methyl group. The crystal-line polyethernitrile includes N units of the repeating units represented by Formula (III) and M units of the repeating units represented by Formula (IV) and N and M are integers satisfying $0.90<[N/(N+M)]<1.00$. The upper limit of [N/(N+M)] is not particularly limited as long as the upper limit is less than 1.00. As the upper limit is closer to 1.00, the melting point becomes higher and thus the upper limit is preferably 0.99 or less and more preferably 0.97 or less. The lower limit of [N/(N+M)] is not particularly limited as long as the lower limit is more than 0.90. A lower limit of less than 0.90 is not suitable because the crystalline properties decrease and the polyethernitrile is amorphous. From the viewpoint of the crystalline properties, N and M are preferably integers satisfying $0.90<[N/(N+M)]\leq 0.99$, more preferably integers satisfying $0.90<[N/(N+M)]\leq 0.97$, and further preferably integers satisfying $0.91\leq[N/(N+M)]\leq 0.97$.

The upper limit of the sum of N and M is not particularly limited. A range of 5 to 10,000 may be exemplified, a range of 5 to 5,000 is preferable, a range of 5 to 1,000 is further preferable, and a range of 5 to 500 is more preferable.

In the crystalline polyethernitrile, further preferable repeating units are represented by Formula (V) and Formula (VI).

(V)

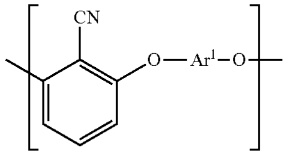

(VI)

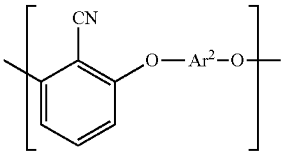

In Formula (V) and Formula (VI), $Ar^1$ and $Ar^2$ have one framework selected from the units represented by Formula (g) to Formula (1). However, $Ar^1$ and $Ar^2$ are not the same. Among them, a framework in which $Ar^1$ represented by Formula (g) or Formula (h) is preferable and framework is further preferably represented by Formula (g).

The framework in which $Ar^2$ represented by Formula (g), Formula (h), Formula (i), Formula (k), or Formula (l) is more preferable. When $Ar^1$ is represented by Formula (g), $Ar^2$ is preferably represented by Formula (h), Formula (i), Formula (k), or Formula (l), whereas $Ar^1$ is represented by Formula (h), $Ar^2$ is preferably represented by Formula (g), Formula (i), Formula (k), or Formula (l).

(g)

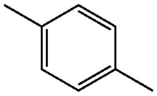

(h)

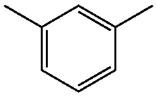

(i)

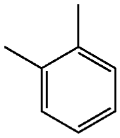

(j)

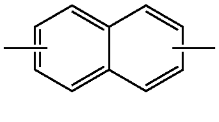

(k)

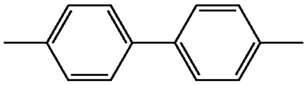

(l)

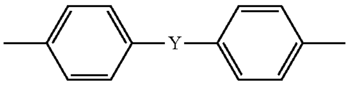

Y =

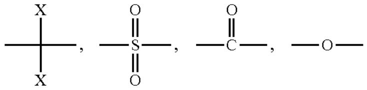

In Formulas, X is a hydrogen atom or a methyl group. The crystalline polyethernitrile includes N units of the repeating units represented by Formula (V) and M units of the repeating units represented by Formula (VI) and N and M are integers satisfying 0.90<[N/(N+M)]<1.00. The upper limit of [N/(N+M)] is not particularly limited as long as the upper limit is less than 1.00. As the upper limit is closer to 1.00, the melting point becomes higher and thus the upper limit is preferably 0.99 or less and more preferably 0.97 or less. The lower limit of [N/(N+M)] is not particularly limited as long as the lower limit is more than 0.90. A lower limit of less than 0.90 is not suitable because the crystalline properties decrease and the polyethernitrile is amorphous. From the viewpoint of the crystalline properties, N and M are preferably integers satisfying 0.90<[N/(N+M)]≤0.99, more preferably integers satisfying 0.90<[N/(N+M)]≤0.97, and further preferably integers satisfying 0.91≤[N/(N+M)] ≤0.97.

The upper limit of the sum of N and M is not particularly limited. A range of 5 to 10,000 may be exemplified, a range of 5 to 5,000 is preferable, a range of 5 to 1,000 is further preferable, and a range of 5 to 500 is more preferable.

The crystalline polyethernitrile is a crystalline polymer having excellent processability. Therefore, the difference between a crystallization temperature when a temperature is lowered from a melted state, that is a crystallization temperature at the time of temperature-fall and the melting point is preferably small to some extent. However, an excessively small difference leads to deteriorated processability. Specifically, the difference between the crystallization temperature at the time of temperature-fall and the melting point is required to be 40° C. to 100° C. Crystalline polyethernitrile having a difference of more than 100° C. results in significant decrease in the crystalline properties, which is not preferable. Crystalline polyethernitrile having a difference of less than 40° C. causes the solidification rate of the melted polymer to be fast and thus processability to deteriorate, which is not preferable. The difference between the melting point and the crystallization temperature at the time of temperature-fall is more preferably 50° C. to 90° C.

The melting point of the crystalline polyethernitrile is 280° C. to 360° C., preferably 280° C. to 350° C., and more preferably 280° C. to 340° C. from the viewpoint of processability.

The end groups of the crystalline polyethernitrile are hydroxy groups, a metal salts of hydroxy groups, halogeno groups, linear organic groups, branched organic groups, and cyclic groups having a carbon number of 1 to 16.

With respect to the crystalline polyethernitrile, the structure of the end groups affects heat stability. The heat stability of the crystalline polyethernitrile can be evaluated by thermos-gravimetric analysis (TG). In the thermogravimetric analysis (TG), a weight loss ratio when the crystalline polyethernitrile is retained at 50° C. for 1 minute under a non-oxidizing atmosphere, thereafter heated from 50° C. to a temperature of the melting point+30° C. at a temperature rising rate of 20° C./min, and retained at the temperature of the melting point+30° C. for 30 minutes is preferably 5% or less, more preferably 4% or less, and further preferably 3% or less. The weight loss ratio is calculated using a weight after one-minute retention at 50° C. as a reference.

The end structure of the crystalline polyethernitrile can be quantified by nuclear magnetic resonance (NMR) analysis. The ends of the crystalline polyethernitrile are not particularly limited as long as the crystalline polyethernitrile satisfies the above heat stability. More preferably, the ratio of the sum of the halogeno groups, the linear organic groups, the branched organic groups, and the cyclic organic groups having a carbon number of 1 to 16 to the sum of the end groups other than the hydroxy groups and the metal salts of hydroxy groups, that is, the total end groups is 0.2 or more and 1.0 or less.

(2) Method of Producing Crystalline Polyethernitrile

A method of producing the polyethernitrile is not particularly limited as long as the method can synthesize the polyethernitrile satisfying the above requirement (1) and any production methods can be adopted. For example, polyethernitrile can be produced by heating a mixture of an aromatic compound (M1) substituted with two hydroxy groups, an aromatic compound (M2) substituted with two hydroxy groups different from the aromatic compound (M1), an aromatic compound having a benzonitrile framework substituted with two halogeno groups (M3), and a base in an organic polar solvent.

Hereinafter, the aromatic compound (M1) substituted with two hydroxy groups, the aromatic compound (M2) substituted with two hydroxyl groups different from the aromatic compound (M1), the aromatic compound having a benzonitrile framework substituted with two halogeno groups (M3), the base, the organic polar solvents, and reaction conditions that are used in the preferable examples, will be described.

The aromatic compound (M1) substituted with two hydroxy groups, the aromatic compound (M2) substituted with two hydroxyl groups different from the aromatic compound (M1) in the method of producing the crystalline polyethernitrile can be exemplified by compounds represented by following General Formulas (m) to (r).

(m)

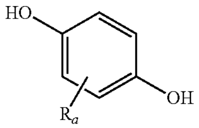

(n)

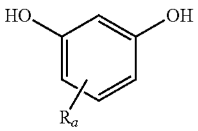

(o)

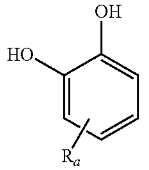

(p)

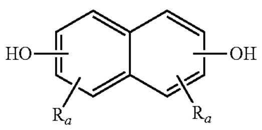

(q)

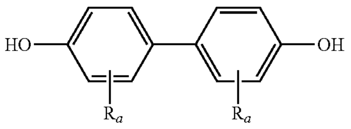

(r)

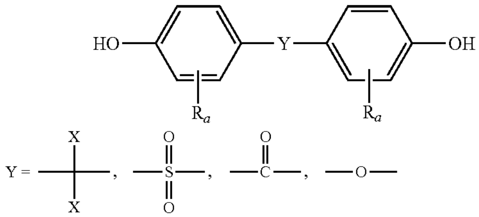

In above Formulas (m) to (r), R is a linear organic group, a branched organic group, or a cyclic organic group having a carbon number of 1 to 6 and optionally contains one or more oxygen atoms, nitrogen atoms, or sulfur atoms. a represents the number of substituents in R and is an integer from 0 to 4. When a plurality of Rs exist, Rs may be the same as or different from each other.

Specifically, resorcinol, 5-methoxyresorcinol, 2-methylresorcinol, 5-methylresorcinol, 2,4-dihydroxybenzaldehyde, 4-ethylresorcinol, 3,5-dihydroxyacetophenone, 4-butylresorcinol, 2-acetylresorcinol, 4-hexylresorcinol, 4-acetylresorcinol, 3,5-dihydroxybenzoic acid, 4-benzoylresorcinol, 4,6-diacetylresorcinol, 2,6-dihydroxybenzoic acid, 2,4-dihydroxybenzoic acid, 4-propionylresorcinol, 3,5-dihydroxybenzamide, 3,5-dihydroxy-4-methylbenzoic acid, 2-nitroresorcinol, 2,6-dihydroxy-4-methylbenzoic acid, 2,4-dihydroxybenzamide, hydroquinone, 1,4-dihydroxynaphthalene, catechol, 4,4'-dihydroxybiphenyl, methylhydroquinone, methoxyhydroquinone, 2,6-dimethylhydroquinone, 2,3-dimethylhydroquinone, trimethylhydroquinone, tetra-methylhydroquinone, 2,5-di-tert-butylhydroquinone, 2,5-di-tert-amylhydroquinone, 2-acetylhydroquinone, 2,5-dihydroxybenzoic acid, phenylhydroquinone, 2,5-dihydroxyterephthalic acid, 1,4-dihydroxy-2-naphthoic acid, 3,6-dihydroxybenzonorbornane, 2,3-dihydroxynaphthalene, 1,2-dihydroxynaphthalene, 4-methylcatechol, 3-methoxycatechol, 3-methylcatechol, 3,4-dihydroxybenzaldehyde, 4-tert-butylcatechol, 2,3-dihydroxybenzaldehyde, 3,4-dihydroxyacetophenone, 3,4-dihydroxybenzophenone, 3,5-di-tert-butylcatechol, 3,4-dihydroxybenzoic acid, 4-nitrocatechol, 2,3-dihydroxybenzoic acid, catechol-4-acetic acid, 4,4'-dihydroxy-3,3',5,5'-tetramethylbiphenyl, 3,3'-dihydroxybenzidine, 1,5-dihydroxynaphthalene, 1,6-dihydroxynaphthalene, 2,6-dihydroxynaphthalene, 2,7-dihydroxynaphthalene, 2,2'-bis(4-hydroxyphenyl)propane, bis(4-hydroxyphenyl)sulfone, 1,1'-bis(4-hydroxyphenyl)methane, 4,4'-dihydroxybenzophenone, and 4,4'-dihydroxydiphenylether may be exemplified as the compounds (M1) and (M2) substituted with two hydroxy groups. From an economic viewpoint, resorcinol, hydroquinone, catechol, 4,4'-dihydroxybiphenyl, 2,7-dihydroxynaphthalene, 2,2'-bis(4-hydroxyphenyl)propane, bis(4-hydroxyphenyl)sulfone, and 1,1'-bis(4-hydroxyphenyl)methane are preferable and resorcinol, hydroquinone, catechol, 4,4'-dihydroxybiphenyl, 2,2'-bis(4-hydroxyphenyl)propane, and bis(4-hydroxyphenyl) sulfone are more preferable.

In the crystalline polyethernitrile, a copolymer sequence may be random or block. From the viewpoint of crystalline properties, the sequence is preferably random. The compound (M1) and compound (M2) substituted with two hydroxy groups are preferably previously mixed and then reacted.

As the compound (M3) having the benzonitrile framework substituted with two halogeno groups in the method of producing the crystalline polyethernitrile, a compound represented by following General Formula (s) is applicable.

(s)

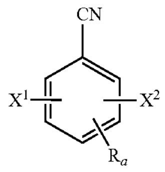

In Formula (s), R is any one of a linear organic group, a branched organic group, or a cyclic organic group having a carbon number of 1 to 6 and optionally contains one or more oxygen atoms, nitrogen atoms, or sulfur atoms. a represents the number of substituents in R and is an integer from 0 to 4. $X^1$ and $X^2$ are independently halogen atoms and may be the same or different. When a plurality of Rs exist, Rs may be the same as or different from each other.

Specifically, 2,6-dichlorobenzonitrile, 2,6-difluorobenzonitrile, 2-chloro-6-fluorobenzonitrile, 2,5-dichlorobenzonitrile, 2-chloro-5-fluorobenzonitrile, 2,5-difluorobenzonitrile, 3,5-dichlorobenzonitrile, 3,5-difluorobenzonitrile, 2,3-dichlorobenzonitrile, 2,3-difluorobenzonitrile, 3-chloro-2-fluorobenzonitrile, 3,4-dichlorobenzonitrile, 3,4-difluorobenzonitrile, 4-chloro-3-fluorobenzonitrile, and 3-chloro-4-fluorobenzonitrile may be exemplified as the compounds (M3) having the benzonitrile framework substituted with two halogeno groups. From an economic viewpoint, 2,6-dichlorobenzonitrile and 2,6-difluorobenzonitrile are preferable and 2,6-dichlorobenzonitrile is more preferable.

The amounts of compounds (M1), (M2), and (M3) used in the method of producing the crystalline polyethernitrile are not particularity limited as long as the sum of the compounds (M1) and (M2) is in the range of 0.90 mol to 1.10 mols relative to 1.00 mol of the compound (M3). From the viewpoint of the physical properties of the polymer, 0.95 mol to 1.05 mols is preferable and 0.95 mol to 1.00 mol is more preferable. The amounts of compounds (M1) and (M2) used is not particularly limited as long as the amounts satisfies 0.90<[Amount of (M1) used (mol)/Total amount of (M1) and (M2) used (mol)]<1.00. From the viewpoint of the physical properties of the polymer, 0.91≤[Amount of (M1) used (mol)/Total amount of (M1) and (M2) used (mol)] <1.00 is preferable and 0.95≤[Amount of (M1) used (mol)/ Total amount of (M1) and (M2) used (mol)]<1.00 is more preferable.

Examples of the base in the method of producing the crystalline polyethernitrile include organic and inorganic bases. Specific examples of the base include organic bases such as 1,8-diazabicyclo[5.4.0]-7-undecene, 1,5-diazabicyclo[4.3.0]-5-nonene, 7-methyl-1,5,7-triazabicyclo[4.4.0]deca-5-ene, and 1,5,7-triazabicyclo[4.4.0]deca-5-ene; alkali metal carbonates such as lithium carbonate, sodium carbonate, potassium carbonate, rubidium carbonate, and cesium carbonate; alkaline earth metal carbonates such as calcium carbonate, strontium carbonate, and barium carbonate; alkali metal bicarbonates such as lithium bicarbonate, sodium bicarbonate, potassium bicarbonate, rubidium bicarbonate, and cesium bicarbonate; alkaline earth metal bicarbonates such as calcium bicarbonate, strontium bicarbonate, and barium bicarbonate; alkaline metal hydroxides such as lithium hydroxide, sodium hydroxide, potassium hydroxide, rubidium hydroxide, and cesium hydroxide; and alkaline earth metal hydroxides such as calcium hydroxide, strontium hydroxide, and barium hydroxide. Of these bases, carbonate salts such as sodium carbonate and potassium carbonate and bicarbonate salts such as sodium bicarbonate and potassium bicarbonate are preferable and sodium carbonate and potassium carbonate are further preferable, and sodium carbonate is further more preferable from the viewpoint of ease of handling and reactivity. These bases can be used singly or in combination of two or more of them. These bases are preferably used in the form of anhydrides and may also be used as hydrates or aqueous mixtures. The aqueous mixtures described herein refers to an aqueous solution, a mixture of an aqueous solution and a solid component, or a mixture of water and a solid component.

The amount of base in the method of producing the crystalline polyethernitrile depends on the total amounts of the aromatic compound (M1) and the aromatic compound (M2). The molar ratio of the base relative to the total molar numbers of the hydroxy groups in the compounds (M1) and (M2) is at least 1 and is preferably 1.2 or more from the viewpoint of reactivity. The upper limit of the base is not particularly limited because excessive use of the base does not cause problems. The practical upper limit of the base is 100 relative to the total molar numbers of the hydroxy groups in (M1) and (M2). The molar ratio of the base relative to the total molar numbers of hydroxy groups in (M1) and (M2) is preferably 1.2 to 10.

In the preferable method of producing the crystalline polyethernitrile, the organic polar solvent used is not particularly limited as long as the solvent does not inhibit the reaction. Specific examples of such organic polar solvents include nitrogen-containing polar solvents such as N-methyl-2-pyrrolidone (NMP), N-methylcaprolactam, N,N-dimethylformamide (DMF), N,N-dimethylacetamide (DMAc), 1,3-dimethyl-2-imidazolidinone (DMI), hexamethylphosphoramide, and tetramethylurea; sulfoxide-based and sulfone-based solvents such as dimethyl sulfoxide (DMSO), dimethylsulfone, diphenylsulfone, and sulfolane, nitrile-based solvents such as benzonitrile, diaryl ethers such as diphenyl ether, ketones such as benzophenone and acetophenone, and mixtures of these solvents. All of these organic polar solvents are preferably used due to high reaction stability. Of these solvents, NMP, DMSO, and sulfolane are preferable and NMP is particularly preferably used. These organic polar solvents have excellent stability at a high temperatures region and are said to be also preferable organic polar solvents from the viewpoint of availability.

As the amount of the organic polar solvent, the total amount of the organic solvent included in the mixture of 0.50 liter or more relative to 1.0 mol of the total benzene ring components included in the mixture may be preferably exemplified. The mixture including 1.00 liter or more may be more preferably exemplified and the mixture including 2.0 liter or more may be further preferably exemplified. The upper limit of the amount of the organic polar solvent in the mixture is not particularly limited and the upper limit is preferably 100 liters or less relative to 1.0 mol of the total benzene ring components in the mixture and more preferably 50 liters or less. Increase in the amount of the organic polar solvent used allows the solubility of the monomers and oligomers at a generation process to be improved and the reactive end groups to be effectively introduced. However, when the amount of the organic polar solvent used is excessively large, the generation amount of the crystalline polyethernitrile per unit volume of a reaction container tends to decrease and the time required for the reaction tends to be longer. Therefore, from the viewpoint of productivity, the amount of the organic polar solvent used is preferably set to the above range of the organic polar solvent used. The amount of the organic polar solvent described here is determined by using the volume of the solvent under normal temperature and pressure as a reference. The amount of the organic polar solvent used in the mixture is the amount of organic polar solvent introduced into the reaction system from which the amount of organic polar solvent excluded from the reaction system by dehydration operation or other operations is subtracted. The benzene ring components in the mixture described here refers to the benzene ring components in the raw materials that may serve as constituents of the repeating units in the crystalline polyethernitrile by reaction. The "molar number" of the benzene ring component in these raw materials represents the "number of benzene rings constituting the compound."

Molecular weight modifiers can be added here, if necessary. As the molecular weight modifiers, compounds represented by Formula (t) can be used.

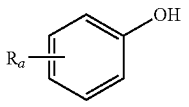

(t)

In Formula (t), R is a linear organic group, a branched organic group, or a cyclic organic group having a carbon number of 1 to 10 and optionally contains one or more oxygen atoms, nitrogen atoms, or sulfur atoms. Rs may be the same as or different from each other. a represents the number of substituents in R and is an integer from 0 to 4. Specific Examples of the molecular weight modifiers include phenol, 4-phenylphenol, 4-tert-butylphenol, 4-cumylphenol, 4-phenoxyphenol, 4-ethylphenol, 4-methoxyphenol, and 4-tert-octylphenol.

In the method of producing the crystalline polyethernitrile, water is generated as a byproduct as the reaction proceeds. For the purpose of removing the byproduct water, organic compounds that form azeotropic mixtures with water can be added, if necessary. Such organic compounds are not particularly limited as long as the organic compounds form the azeotropic mixtures with water. Non-polar organic solvents having a lower boiling point than that of the reaction solvent are preferable. Specifically, toluene may be exemplified. The amount of organic compounds is not particularly limited as long as the reaction is not inhibited. The amount is preferably 0% to 50%, more preferably 0% to 20%, and further preferably 0% to 10% in a volume ratio relative to the above amount of the organic polar solvent.

The method of producing the crystalline polyethernitrile is performed under heating under a nitrogen atmosphere or under reduced pressure The reaction temperature can be varied across a wide range. The reaction may be performed at a temperature of at least 80° C. and preferably at least 150° C. and performed at a maximum temperature of 400° C. and, from the viewpoint of productivity, preferably at a maximum temperature of 350° C. Considering the sublimation and reactivity of the compounds to be used, the reaction is preferably performed at 150° C. to 350° C. and more preferably 150° C. to 200° C. while the temperature is being raised stepwise. Furthermore, for the purpose of improve the reactivity, the reaction is performed with stirring.

The reaction time in the method of producing the crystalline polyethernitrile can widely vary depending on the reaction temperature, the properties of the reagents used, and the presence of solvents to some extent and is 0.1 hour to 100 hours and preferably 0.5 hour to 50 hours from the viewpoint of the productivity.

The reaction container in the method of producing the crystalline polyethernitrile is not particularly limited as long as the container can withstand the above reaction temperatures. Containers made of glass or containers made of stainless steel can be used.

In the method of the producing crystalline polyethernitrile, the pressure applied to the reaction may be pressure under which the reactants are maintained to be a liquid phase in the reaction medium and a pressure 1 atm to 10 atm may be used and, from the viewpoint of productivity, the pressure is preferably 1 atm to 2 atm.

In the method of producing the crystalline polyethernitrile, the produced crystalline polyethernitrile can be obtained by separating and recovering from the reaction mixture obtained by the production method described above. The reaction mixture obtained by the above production method includes at least the crystalline polyethernitrile and may include unreacted raw materials, byproduct salts, unreacted bases and the like as other components. The method of recovering the crystalline polyethernitrile from such a reaction mixture is not particularly limited. Examples of the method include a method of recovering the crystalline polyethernitrile by contacting with a solvent having solubility to the byproduct salt under heating, if necessary and a method of removing the byproduct salt and the unreacted organic base under reduced pressure.

In the method of recovery by contact with a solvent that has solubility in the byproduct salt and, if necessary, under heating, the solvent used is generally a solvent of relatively high polarity. Preferable solvent differs depending on the use base and the kinds of the byproduct salt, water; alcohols represented by methanol, ethanol, propanol, iso-propanol, butanol, and hexanol; ketones represented by acetone and methyl ethyl ketone; acetic acid esters represented by ethyl acetate and butyl acetate; nitrogen-containing polar solvents such as N-methyl-2-pyrrolidone (NMP), N-methylcaprolactam, N,N-dimethylformamide (DMF), N,N-dimethylacetoamide (DMAc), 1,3-dimethyl-2-imidazolidinone (DMI), hexamethylphosphoramide, and tetramethylurea; sulfoxide-based and sulfone-based solvents such as dimethyl sulfoxide (DMSO), dimethyl sulfone, diphenyl sulfone, and sulfolan, and acids such as acetic acid, hydrochloric acid, sulfuric acid, and nitric acid may be exemplified. From the viewpoint of availability and economy, water, methanol, acetone, acetic acid, hydrochloric acid, sulfuric acid, and NMP are preferable and water, acetic acid, hydrochloric acid, and NMP are more preferable.

In the method of removing the byproduct salts and the unreacted organic bases under reduced pressure, this method may be performed after the completion of the reaction in the range from 0.001 atm to 1 atm and, if necessary, under heating.

With respect to the crystalline polyethernitrile, the structure can be confirmed by an infrared spectroscopy method and a nuclear magnetic resonance spectroscopy method.

The crystalline polyethernitrile has excellent heat resistance, chemical resistance, flame retardancy, and electrical and mechanical properties and can be molded by injection molding, injection compression molding, blow molding, and extrusion molding. At this time, the crystalline polyethernitrile may be used singly or inorganic fillers such as glass fibers, carbon fibers, titanium dioxide, and calcium carbonate, antioxidants, heat stabilizers, UV absorbers, and colorants may be added to the crystalline polyethernitrile, as desired. Resins other than the crystalline polyeternitrile may also be blended.

The crystalline polyethernitrile may have hydroxy groups at the end. In this instance, excellent adhesion to other resins and materials and control of thermal properties due to interaction between the additives and the hydroxy group ends may be expected.

As the applications of the crystalline polyethernitrile, electric and electronic parts, home and office appliance parts, optical equipment and precision machinery parts, water-related parts, automobile and vehicle-related parts, and other industrial applications may be exemplified.

EXAMPLES

Hereinafter, our crystalline polyethernitriles will be described in detail with reference to Examples. These Examples are exemplification and non-limiting.

Determination of Structure

The structure of crystalline polyethernitrile was determined using an infrared spectroscopy (IR) method or a nuclear magnetic resonance spectroscopy (NMR) method.

IR spectrum was measured by a KBr tablet method using IRPRestige-21 manufactured by Shimadzu Corporation. As NMR, 1H-NMR measurement was performed using JNM-ECZ-500R manufactured by JEOL Ltd. in deuterated DMSO or in a mixed solvent of pentafluorophenol/deuterated chloroform=5/3 (volume ratio). [N/(N+M)] and the ratio of the end groups other than the hydroxy groups and the metal salts of the hydroxy groups relative to the total end groups were calculated from the ratios of the integral values of the spectrum.

Molecular Weight Measurement

The molecular weight of the crystalline polyethernitrile was determined by measurement of gel permeation chromatography (GPC), which is a kind of size-exclusion chromatography (SEC) or by the NMR measurement. The GPC measurement was performed using SSC-7110 manufactured by Senshu Scientific Co., Ltd. at 250° C. in 1-chloronaphthalene and calculated in terms of polystyrene. In the NMR measurement, the molecular weight was calculated from the ratio of the integral value of the peak derived from the end groups to the integral value of the peak derived from the main chain.

Measurement of Melting Point, Glass Transition Temperature, and Crystallization Temperature at the Time of Temperature-Fall The melting point (Tm), the glass transition temperature (Tg), and the crystallization temperature at the time of temperature-fall (Tc) of the crystalline polyethernitrile were determined by differential scanning calorimetry (DSC) measurement. The DSC measurement was performed using Q20 manufactured by T.A. Instruments. A temperature was raised from 50° C. to 400° C. at 20° C./min, retained at 400° C. for one minute, and thereafter lowered from 400° C. to 50° C. at 20° C./min. The temperature was raised again from 50° C. to 400° C. at 20° C./min, retained at 400° C. for one minute, and thereafter lowered from 400° C. to 100° C. at 20° C./min. The melting point was calculated from the result obtained during the second temperature raising and the crystallization temperature at the time of temperature-fall was calculated from the result obtained during the second temperature lowering. The "melting point—crystallization temperature at the time of temperature-fall" was calculated from the obtained melting point and crystallization temperature at the time of temperature-fall.

Thermogravimetric Analysis (TG)

Apparatus: TGA7 manufactured by PerkinElmer Co., Ltd.

Measurement atmosphere: Under nitrogen gas flow

Temperature Rising Program:

(a) A compound was retained for 1 minute at a program temperature of 50° C.

(b) The compound was heated to the melting point+30° C. in a crystalline compound and the compound was heated to the glass transition temperature+100° C. in an amorphous compound from the program temperature of 50° C. at a temperature rising rate of 20° C./min (c) The compound was retained for 30 minutes at the melting point+30° C. in the crystalline compound and the compound was retained for 30 minutes at the glass transition temperature+100° C. in the amorphous compound Weight loss ratio: A weight after 1-minute retention at 50° C. was used as a reference. The weight loss ratio was calculated from a weight after 30-minute retention at the melting point+30° C. in the crystalline compound and at the glass transition temperature+100° C. in the amorphous compound.

Raw Materials Used in Examples

Aromatic Compounds Substituted with Two Hydroxy Groups (M1) and (M2)

(M-1) Hydroquinone (FUJIFILM Wako Pure Chemical Corporation)

(M-2) Resorcinol (FUJIFILM Wako Pure Chemical Corporation)

(M-3) 4,4'-Dihydroxybiphenyl (Tokyo Chemical Industry Co., Ltd.)

(M-4) 2,2-Bis(4-hydroxyphenyl)propane (Tokyo Chemical Industry Co., Ltd.))

(M-5) 1,6-Dihydroxynaphthalene (Tokyo Chemical Industry Co., Ltd.)

(M-6) Catechol (Tokyo Chemical Industry Co., Ltd.)

Compounds Having a Benzonitrile Framework Substituted with Two Halogeno Groups (M3)

(M3-1) 2,6-Dichlorobenzonitrile (Tokyo Chemical Industry Co., Ltd.)

(M3-2) 2,6-Difluorobenzonitrile (Tokyo Chemical Industry Co., Ltd.)

Bases (B-1) Sodium carbonate (Kanto Chemical Co., Inc.)

(B-2) Potassium carbonate (Kanto Chemical Co., Inc.)

Organic Polar Solvent (S-1) NMP (FUJIFILM Wako Pure Chemical Corporation)

Molecular Weight Modifier (A-1) 4-Tert-butylphenol (Kanto Chemical Co., Inc.)

Example 1

Into a 300-mL separable flask equipped with a stirrer, nitrogen inlet tube, and Dean-Stark tube, 8.37 g (76.0 mmol) of hydroquinone as an aromatic compound (M1), 0.44 g (4.0 mmol) of resorcinol as an aromatic compound (M2), 13.93 g (81.0 mmol) of 2,6-dichlorobenzonitrile as a compound having a benzonitrile framework (M3), 9.33 g (88.0 mmol) of sodium carbonate as a base were charged. Under a nitrogen atmosphere, 80 mL of NMP and 3 mL of toluene were added and the resultant mixture was reacted at 160° C. for 0.5 hour and then at 200° C. for 5 hours. After completion of the reaction, the reacted mixture was cooled to room temperature and 80 mL of NMP and 600 mL of water were added. The obtained white product was further washed with 600 mL of warm water (80° C.) to give 14.0 g of a white solid. As a result of the NMR measurement, chloro group end-derived peaks at 6.97 to 6.99 ppm, hydroxy group end-derived peaks at 7.11 to 7.13 ppm, a resorcinol-derived peak at 7.16 ppm (one proton at the 2-position), a hydroquinone-derived peak at 7.41 ppm (4 protons at 2-, 3-, 5-, and 6-positions), and main-chain benzonitrile framework peaks (1 proton at 3-position) at 7.59 to 7.62 ppm were observed. Form the ratios of respective integral values, [N/(N+M)], the molecular weight (Mn), the ratio of the halogeno groups relative to both ends were calculated. The melting point (Tm) was 341° C., the glass transition temperature (Tg) was 176° C., the crystallization temperature at the time of temperature-fall (Tc) was 265° C., and "Melting point—Crystallization temperature at the time of temperature-fall" was 76° C. A weight loss ratio when the polymer was retained at the melting point+30° C. for 30 minutes was 0.2%.

Example 2

14.1 g of a white solid was obtained by performing the same operations as the operations in Example 1 except that the amount of hydroquinone used was set to 8.02 g (72.8 mmol), the amount of resorcinol used was set to 0.79 g (7.2 mmol), and the amount of sodium carbonate used was set to 8.48 g (80.0 mmol). As the result of IR measurement using the obtained solid, peaks indicating the crystalline polyethernitrile framework were observed at 2230 $cm^{-1}$, 1580 $cm^{-1}$, 1460 $cm^{-1}$, 1240 $cm^{-1}$, 1020 $cm^{-1}$, 850 $cm^{-1}$, and 780 $cm^{-1}$.

Example 3

14.8 g of a white solid was obtained by performing the same operations as the operations in Example 1 except that the amount of hydroquinone used was set to 8.79 g (79.8 mmol) and 0.04 g (0.2 mmol) of 4,4'-dihydroxybiphenyl was used as the aromatic compound (M2).

Example 4

15.0 g of a white solid was obtained by performing the same operations as the operations in Example 1 except that 0.91 g (4.0 mmol) of 2,2-bis(4-hydroxyphenyl)propane was used as the aromatic compound (M2).

Example 5

Into a 300-mL separable flask equipped with a stirrer, nitrogen inlet tube, and Dean-Stark tube, 8.02 g (72.8 mmol) of hydroquinone as the aromatic compound (M1), 1.34 g (7.2 mmol) of 4,4'-dihydroxybiphenyl as the aromatic compound (M2), 0.12 g (0.8 mmol) of 4-tert-butylphenol as the molecular weight modifier, 13.93 g (81.0 mmol) of 2,6-dichlorobenzonitrile as the compound having a benzonitrile framework (M3), and 9.33 g (88.0 mmol) of sodium carbonate as the base were charged. Under a nitrogen atmosphere, 80 mL of NMP and 3 mL of toluene were added and the resultant mixture was reacted at 160° C. for 0.5 hour and then at 200° C. for 5 hours. After completion of the reaction, the reacted mixture was cooled to room temperature and 80 mL of NMP and 600 mL of water were added. The obtained white product was further washed with 600 mL of warm water (80° C.) to give 14.0 g of a white solid.

Example 6

14.0 g of a white solid was obtained by performing the same operations as the operations in Example 1 except that 8.37 g (76.0 mmol) of resorcinol was used as the aromatic compound (M1) and 0.44 g (4.0 mmol) of hydroquinone was used as the aromatic compound (M2). Molecular weights (Mn and Mw) were calculated from the GPC measurement.

Example 7

13.9 g of a white solid was obtained by performing the same operations as the operations in Example 1 except that 0.44 g (4.0 mmol) of catechol was used as the aromatic compound (M2).

Example 8

14.8 g of a white solid was obtained by performing the same operations as the operations in Example 1 except that 14.86 g (79.8 mmol) of 4,4'-dihydroxybiphenyl was used as the aromatic compound (M1) and the amount of resorcinol used was set to 0.02 g (0.2 mmol). Molecular weights (Mn and Mw) were calculated from the GPC measurement.

Example 9

13.8 g of a white solid was obtained by performing the same operations as the operations in Example 5 except that the amount of hydroquinone used was set to 8.02 g (72.8 mmol), 0.79 g (7.2 mmol) of resorcinol was used as the aromatic compound (M2), and the amount of 4-tert-butylphenol used was set to 0.24 g (1.6 mmol).

Comparative Example 1

14.1 g of a white solid was obtained by performing the same operations as the operations in Example 1 except that the amount of hydroquinone used was set to 6.61 g (60.0 mmol), the amount of resorcinol used was set to 2.20 g (20.0 mmol), and the amount of 2,6-dichlorobenzonitrile used was set to 14.10 g (82.0 mmol). Molecular weights (Mn and Mw) were calculated from the GPC measurement.

Comparative Example 2

14.2 g of a white solid was obtained by performing the same operations as the operations in Example 1 except that 6.17 g (56.0 mmol) of resorcinol was used as the aromatic compound (M1), 4.47 g (24.0 mmol) of 4,4'-dihydroxybiphenyl was used as the aromatic compound (M2), and the amount of 2,6-dichlorobenzonitrile used was set to 12.11 g (70.4 mmol). Molecular weights (Mn and Mw) were calculated from the GPC measurement.

Comparative Example 3

Into a 300-mL separable flask equipped with a stirrer, nitrogen inlet tube, and Dean-Stark tube, 8.81 g (80 mmol) of hydroquinone, 14.10 g (82 mmol) of 2,6-dichlorobenzonitril, and 9.75 g (92 mmol) of sodium carbonate were charged. Under a nitrogen atmosphere, 80 mL of NMP and 3 mL of toluene were added and the resultant mixture was reacted at 160° C. for 0.5 hour and then at 200° C. for 5 hours. After completion of the reaction, the reacted mixture was cooled to room temperature and 80 mL of NMP and 600 mL of water were added. The obtained white product was further washed with 600 mL of warm water (80° C.) to give 14.0 g of a white solid.

Comparative Example 4

14.0 g of a white solid was obtained by performing the same operations as the operations in Example 1 except that the amount of hydroquinone used was set to 6.17 g (56.0 mmol), the amount of resorcinol used was set to 2.64 g (24.0 mmol), and the amount of 2,6-dichlorobenzonitrile used was set to 14.10 g (82.0 mmol). Molecular weights (Mn and Mw) were calculated from the GPC measurement.

Comparative Example 5

18.2 g of a white solid was obtained by performing the same operations as the operations in Example 1 except that 7.45 g (40.0 mmol) of 4,4'-dihydroxybiphenyl as the aromatic compound (M1), 6.41 g (40.0 mmol) of 1,6-dihydroxynaphthalene as the aromatic compound (M2), 11.27 g (81.0 mmol) of 2,6-difluorobenzonitrile as the compound having a benzonitrile framework (M3), and 12.16 g (88.0 mmol) of potassium carbonate as the base were used. Molecular weights (Mn and Mw) were calculated from the GPC measurement.

Comparative Example 6

15.0 g of a white solid was obtained by performing the same operations as the operations in Example 1 except that the amount of hydroquinone used was set to 7.93 g (72.0 mmol) and 1.83 g (8.0 mmol) of 2,2-bis(4-hydroxyphenyl) propane as the aromatic compound (M2).

Comparative Example 7

14.0 g of a white solid was obtained by performing the same operations as the operations in Example 1 except that the amount of hydroquinone used was set to 7.93 g (72.0 mmol) and 0.88 g (8.0 mmol) of catechol was used as the aromatic compound (M2).

TABLE 1

| | Example 1 | Example 2 | Example 3 | Example 4 | Example 5 | Example 6 | Example 7 | Example 8 | Example 9 |
|---|---|---|---|---|---|---|---|---|---|
| M1 | M-1 | M-1 | M-1 | M-1 | M-1 | M-2 | M-1 | M-3 | M-1 |
| M2 | M-2 | M-2 | M-3 | M-4 | M-3 | M-1 | M-6 | M-2 | M-2 |
| M3 | M3-1 | M3-1 | M3-1 | M3-1 | M3-1 | M3-1 | M3-1 | M3-1 | M3-1 |
| M1/M2 (Molar ratio) | 95/5 | 91/9 | 99.75/025 | 95/5 | 91/9 | 95/5 | 95/5 | 99.75/0.25 | 91/9 |
| Base | B-1 | B-1 | B-1 | B-1 | B-1 | B-1 | B-1 | B-1 | B-1 |
| Solvent | S-1 | S-1 | S-1 | S-1 | S-1 | S-1 | S-1 | S-1 | S-1 |
| Molecular weight modifier | — | — | — | — | A-1 | — | — | — | A-1 |
| Mn | 13000 | 7000 | 9000 | 15000 | 17000 | 5000 | 28000 | 11000 | 10000 |
| Mw | — | — | — | — | — | 27000 | — | 56000 | — |
| N/ (N + M) | 0.96 | 0.91 | 0.99 | 0.94 | 0.91 | 0.95 | 0.94 | 0.99 | 0.91 |
| Melting point | 341° C. | 337° C. | 360° C. | 342° C. | 350° C. | 325° C. | 340° C. | 351° C. | 334° C. |
| Glass transition temperature | 176° C. | 158° C. | 179° C. | 175° C. | 174° C. | 137° C. | 174° C. | 201° C. | 173° C. |
| Crystallization temperature at the time of temperature-fall | 265° C. | 260° C. | 275° C. | 253° C. | 261° C. | 271° C. | 241° C. | 261° C. | 247° C. |
| Deference between melting point and crystallization temperature at the time of temperature-fall | 76° C. | 77° C. | 85° C. | 89° C. | 89° C. | 54° C. | 99° C. | 90° C. | 87° C. |
| Ends other than hydroxy group and metal salt of hydroxy group/Total ends | 0.69 | 1.00 | 0.99 | 0.96 | 1.00 | 0.56 | 1.00 | 0.96 | 0.93 |
| Weight loss ratio | 0.2% | 0.3% | 0.1% | 0.0% | 0.0% | 0.2% | 0.0% | 0.2% | 0.1% |

TABLE 2

| | Comparative Example 1 | Comparative Example 2 | Comparative Example 3 | Comparative Example 4 | Comparative Example 5 | Comparative Example 6 | Comparative Example 7 |
|---|---|---|---|---|---|---|---|
| M1 | M-1 | M-2 | M-1 | M-1 | M-3 | M-1 | M-1 |
| M2 | M-2 | M-3 | — | M-2 | M-5 | M-4 | M-6 |
| M3 | M3-1 | M3-1 | M3-1 | M3-1 | M3-2 | M3-1 | M3-1 |
| M1/M2 (Molar ratio) | 75/25 | 70/30 | 100/0 | 70/30 | 50/50 | 90/10 | 90/10 |
| Base | B-1 | B-1 | B-1 | B-1 | B-2 | B-1 | B-1 |
| Solvent | S-1 | S-1 | S-1 | S-1 | S-1 | S-1 | S-1 |
| Mn | 9000 | 6000 | 1600 | 8000 | 15000 | 15000 | 20000 |
| Mw | 41000 | 27000 | — | 40000 | 80000 | — | — |
| N/ (N + M) | 0.76 | 0.71 | 1.00 | 0.71 | 0.51 | 0.89 | 0.90 |
| Melting point | N.D. | N.D. | 373° C. | N.D. | N.D. | N.D. | N.D. |
| Glass transition temperature | 162° C. | 164° C. | 175° C. | 162° C. | 181° C. | 180° C. | 181° C. |
| Crystallization temperature at the time of temperature-fall | N.D. | N.D. | 284° C. | N.D. | N.D. | N.D. | N.D. |
| Deference between melting point and crystallization temperature at the time of temperature-fall | N.D. | N.D. | 89° C. | N.D. | N.D. | N.D. | N.D. |
| Ends other than hydroxy group and metal salt of hydroxy group/Total ends | 1.00 | 0.02 | 1.00 | 1.00 | 1.00 | 1.00 | 1.00 |
| Weight loss ratio | 0.5% | 21.0% | 0.1% | 1.8% | 2.5% | 2.0% | 0.0% |

From the results of Examples 1 to 9, setting the amounts of the aromatic compounds (M1) and (M2) used at 0.90<[Amount of (M1) used (mol)/Total amount of (M1) and (M2) used (mol)]<1.00 results in [N/(N+M)] in the range of 0.90<[N/(N+M)]<1.00. Consequently, the crystalline polyethernitrile having excellent heat stability was obtained by controlling the end structure at a difference between the melting point and the crystallization temperature at the time of temperature-fall of 40° C. to 100° C. and a melting point of 280° C. to 360° C. On the other hand, from the results of Comparative Examples 1, 2, 4, 5, 6, and 7, crystalline properties were significantly decreased when the amounts of aromatic compounds (M1) and (M2) used were outside the above ranges. From the results of Comparative Example 2, thermal stability deteriorated as the amount of halogeno end groups decreased. In addition, from the result of Comparative Example 3, the polymer made of the single monomer had a melting point of 373° C., which is a high melting point.

The invention claimed is:

1. A crystalline polyethernitrile with a difference between a melting point and a crystallization temperature at a time of temperature-fall being 40° C. or more and 100° C. or less, the crystalline polyethernitrile comprising N repeating units represented by Formula (I) and M repeating units represented by Formula (II), N and M being integers satisfying 0.90<[N/(N+M)]<1.00:

(I)

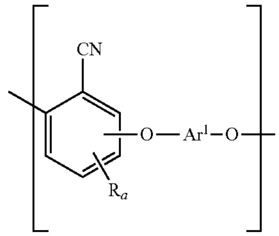

(II)

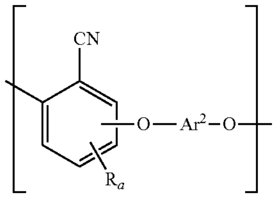

wherein Formulas (I) and (II) satisfy (A) or (B):

(A) $Ar^1$ has one framework selected from units represented by Formula (e) and Formula (f), and $Ar^2$ has one framework selected from units represented by Formula (a) to Formula (c), Formula (e), and Formula (f), with a proviso that $Ar^1$ and $Ar^2$ are not the same; and (B) $Ar^1$ has one framework selected from units represented by Formula (a) to Formula (c), and $Ar^2$ has one framework selected from units represented by Formula (c) and Formula (e), with proviso that $Ar^1$ and $Ar^2$ are not the same, (a)

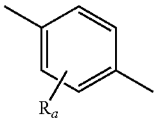

(b)

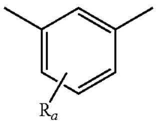

(c)

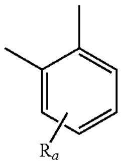

(e)

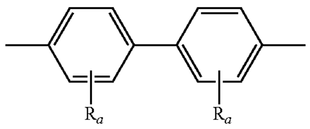

(f)

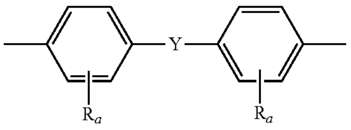

-continued

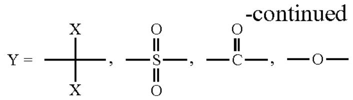

in Formulas (I) and (II) and Formula (a) to Formula (c), Formula (e), and Formula (f), $R_a$ is any one of a linear organic group, a branched organic group, or a cyclic organic group having a carbon number of 1 to 6, and optionally has one or more oxygen atoms, nitrogen atoms, and sulfur atoms; $R_a$ is same as or different from each other; a represents number of substituents in $R_a$ and is an integer from 0 to 4; and X is a hydrogen atom or a methyl group.

2. The crystalline polyethernitrile according to claim 1, comprising N repeating units represented by Formula (III) and M repeating units represented by Formula (IV), N and M being integers satisfying $0.90<[N/(N+M)]<1.00$:

(III)

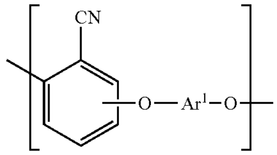

(IV)

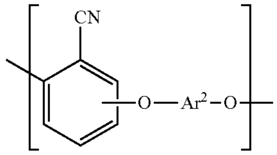

wherein Formulas (III) and (IV) satisfy (C) or (D):

(C) $Ar^1$ has one framework selected from units represented by Formula (k) and Formula (1), and $Ar^2$ has one framework selected from units represented by Formula (g) to Formula (i), Formula (k), and Formula (1), with a proviso that $Ar^1$ and $Ar^2$ are not same; and (D) $Ar^1$ has one framework selected from units represented by Formula (g) to Formula (i), and $Ar^2$ has one framework selected from units represented by Formula (i) and Formula (k), with proviso that $Ar^1$ and $Ar^2$ are not the same, (g)

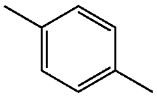

(h)

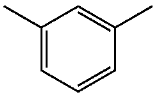

(i)

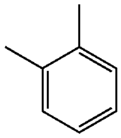

-continued (k)

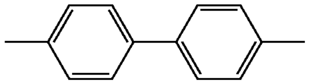

(l)

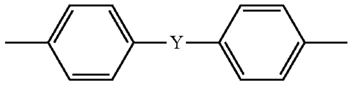

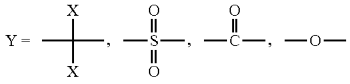

where X is a hydrogen atom or a methyl group.

3. The crystalline polyethernitrile according to claim 1, comprising N repeating units represented by Formula (V) and M repeating units represented by Formula (VI), N and M being integers satisfying 0.90<[N/(N+M)]<1.00:

(V)

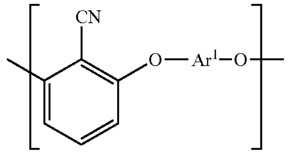

(VI)

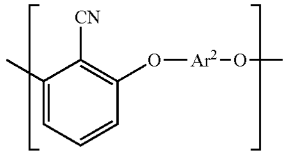

wherein Formulas (V) and (VI) satisfy (E) or (F):

(E) $Ar^1$ has one framework selected from units represented by Formula (k) and Formula (1), and $Ar^2$ has one framework selected from units represented by Formula (g) to Formula (i), Formula (k), and Formula (1), with a proviso that $Ar^1$ and $Ar^2$ are not same; and (F) $Ar^1$ has one framework selected from units represented by Formula (g) to Formula (i), and $Ar^2$ has one framework selected from units represented by Formula (i) and Formula (k), with proviso that $Ar^1$ and $Ar^2$ are not the same, (g)

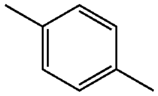

(h)

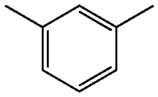

(i)

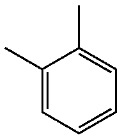

(k)

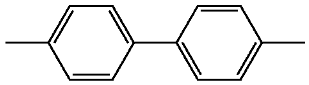

(l)

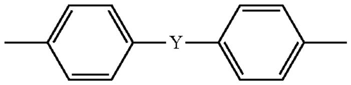

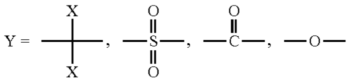

where X is a hydrogen atom or a methyl group.

4. The crystalline polyethernitrile according to claim 1, wherein in Formulas (I) and (II) satisfying said (B), $Ar^1$ is a para-phenylene framework or a meta-phenylene framework.

5. The crystalline polyethernitrile according to claim 1, wherein a melting point of the crystalline polyethernitrile is 280° C. or more and 360° C. or less.

6. The crystalline polyethernitrile according to claim 1, wherein a weight loss ratio of the crystalline polyethernitrile during 30-minute retention at melting point+30° C. under a non-oxidizing atmosphere in thermogravimetric analysis (TG) is 5% or less.

7. The crystalline polyethernitrile according to claim 2, wherein in Formulas (III) and (IV) satisfying said (D), $Ar^1$ is a para-phenylene framework or a meta-phenylene framework.

8. The crystalline polyethernitrile according to claim 3, wherein in Formulas (V) and (VI) satisfying said (F), $Ar^1$ is a para-phenylene framework or a meta-phenylene framework.

* * * * *